US005854641A

United States Patent [19]
Howard et al.

[11] Patent Number: 5,854,641
[45] Date of Patent: Dec. 29, 1998

[54] METHOD AND APPARATUS FOR DISPLAY IMAGE ROTATION

[75] Inventors: Brian D. Howard, Menlo Park; Robert L. Bailey, San Jose, both of Calif.

[73] Assignee: Apple Computer, Inc., Cupertino, Calif.

[21] Appl. No.: 721,482

[22] Filed: Sep. 27, 1996

[51] Int. Cl.[6] .................................................. G06F 12/06
[52] U.S. Cl. ...................... 345/517; 345/126; 345/437; 382/296
[58] Field of Search .................................. 345/126, 516, 345/517, 437; 382/296–298

[56] References Cited

U.S. PATENT DOCUMENTS

| 4,952,920 | 8/1990 | Hayashi | 345/126 |
| 4,995,089 | 2/1991 | Altrieth, III | 345/126 |
| 5,533,185 | 7/1996 | Lentz et al. | 345/126 |

*Primary Examiner*—Kee M. Tung
*Attorney, Agent, or Firm*—Richard C. Liu

[57] ABSTRACT

A method and an apparatus for rotating images on a computer system is disclosed. The system includes a processor for accessing an image frame buffer using a set of CPU addresses, a memory for storing the frame buffer, a controller for directing the pixel data of the frame buffer to a display device using a set of controller addresses. The two sets of addresses are not necessarily the same. In fact, numerous advantages could be had from manipulating those two sets of addresses resulting in image rotation operations for the display device.

8 Claims, 9 Drawing Sheets

| Display Size h × v (Pxls) | Max. b (Bits/Pxl) | Bus Width w (Bits) | $v \leq V = 2^r$ $V \geq v$ | | $H = 2^{c+n}$ $H \geq h \cdot b/8$ $2^n = w/8$ | | | | Graphics Controller's Use of CPU Address Bits | | |
|---|---|---|---|---|---|---|---|---|---|---|---|
| | | | Min. V (Lines) | r (Bits) | Min. H (Bytes) | c (Bits) | n (Bits) | | Row Address | Column Address | Byte Address |
| 480 × 640 | 8 | 32 | 1024 | 10 | 512 | 7 | 2 | | A18 - 9 | A8 - 2 | A1 - 0 |
| 480 × 640 | 16 | 32 | 1024 | 10 | 1024 | 8 | 2 | | A19 - 10 | A9 - 2 | A1 - 0 |
| 600 × 800 | 32 | 32 | 1024 | 10 | 4096 | 10 | 2 | | A21 - 12 | A11 - 2 | A1 - 0 |
| 768 × 1024 | 32 | 64 | 1024 | 10 | 4096 | 9 | 3 | | A21 - 12 | A11 - 3 | A2 - 0 | h = width of vertical-format display, in pixels   H = width of vertical-format defined buffer, in bytes
v = height of vertical-format display, in pixels   V = height of vertical-format defined buffer, in lines
b = color depth, in bits per pixel
w = width of bus to frame-buffer memory, in bits

FIG. 3B

METHOD AND APPARATUS FOR DISPLAY IMAGE ROTATION

FIELD OF THE INVENTION

This invention relates generally to a processor-controlled system such as a computer system and, more particularly, but not exclusively, to an electrical arrangement in the system for managing video information for rotating computer display images.

BACKGROUND INFORMATION

Among the many image resolutions for computer displays in the market today, a common resolution for computer displays is 640×480. Such resolution for a display refers to a display having an overall screen measuring 640 pixels wide by 480 lines high. In fact, any displays having this horizontal format (i.e., its width being greater than its height) would provide ease and convenience for certain computer operations including showing TV images, operating drawing programs and performing spreadsheet calculations. Nevertheless, displays with a vertical format (i.e., its height being greater than its width) are better suited for certain other operations such as word processing, program coding and Internet access. One may suggest a computer display having a square viewing area (i.e., equal height and width) for satisfying both requirements, but practically speaking, the most common computer displays today are rectangular, and that forces an user to choose either a horizontally or a vertically formatted display at the time of purchase.

It would be ideal if a display device could rotate between the horizontal format and the vertical format depending on user needs and preference. While this rotation feature is useful for operating numerous computer applications, it is especially advantageous for pen-based and hand-held computers where the user's ability to comfortably operate the computer is greatly affected by the orientation and position in which the computer is held.

One known implementation discloses a computer system having a display device which can be physically rotated along its sides 90 degrees in either of two directions. Such a system can then cause the display device to display its image contents correctly adjusted for the newly-rotated display orientation. Unfortunately, typical image orientation adjustments for the rotated display monitor have significant performance penalty associated with their necessary calculation-intensive axis transformations.

SUMMARY OF THE INVENTION

It would be desirable and therefore an object for the present invention to provide a method and apparatus for rotating computer display images 90 degrees on a display device with little or no transformation calculations. It is another object for the present invention to provide the image rotation for the display device in both clockwise and counter-clockwise directions to support both left-handed and right-handed users. Yet another object for the present invention is to implement such rotation feature without significant system performance penalty.

Additional objects and advantages of the present invention will be set forth in the description which follows, and in part, will be obvious from the description or may be learned by practice of the invention. To achieve the foregoing objects, and in accordance with the purpose of the invention as embodied and broadly described herein, briefly, there is provided an apparatus including a memory system containing an image frame buffer for an associated display device, this memory system being coupled to a CPU and also being coupled to the display device via its video display controller. The image frame buffer can be manipulated by the CPU and retrieved by the video display controller for use by the display device. One aspect of the invention discloses an implementation wherein the CPU addresses the image frame buffer in a manner advantageous for CPU manipulation and the video display controller addresses the same image frame buffer in another manner advantageous for frame buffer retrieval by the video display controller. Such retrieval includes image presentations on the display device in a vertical format as well as in a horizontal format depending on user selection. During image rotation, one preferred but not limiting aspect of the invention provides the memory system, under the control of the video display controller, physically storing the image frame buffer in memory locations which are different from the locations as addressed by the CPU. Although typical display image rotation can be accomplished entirely in software, another aspect of the present invention provides an implementation that is operable entirely in hardware.

The present invention also may take advantage of the fact that the image frame buffer in the memory system is typically defined as a series of bytes storing the image information for the first horizontal line of the display device, followed by a fixed gap of unused bytes, and followed by another series of bytes for the next horizontal line of the display device, then another gap of unused bytes, and so on. For a display device measuring h pixels wide, by v pixels high, this makes an image frame buffer of v lines, each line containing the number of bytes needed to store the image data for h pixels plus a fixed number of unused gap bytes. The image frame buffer implemented as described provides further advantages for image rotation, if two other conditions are met: 1. A "defined frame buffer" (which contains the portion of the frame buffer used for the actual display data) starts at a page boundary address where all the address bits needed to describe offsets within the defined frame buffer are 0 (for a 1 megabyte buffer, for example, this means the least significant 20 bits of the lowest defined buffer address should be 0, a condition met by any hexadecimal address ending in 00000); and 2. The sum of the number of image data bytes per display line plus the number of gap bytes per line is a power of 2 (such as $2^{10}$=1024 bytes).

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3B provides a table illustrating a number of the frame buffer addressing parameters for several typical display resolutions currently available;

DESCRIPTION OF EMBODIMENTS

Reference will now be made in detail to preferred embodiments of the invention. While the invention will be described in conjunction with the preferred embodiments, it should be understood that they are not intended to limit the invention to these embodiments. On the contrary, the invention is intended to cover alternatives, modifications, and equivalents, which may be included within the spirit and scope of the invention as defined by the appended claims.

Throughout this detailed description numerous details are set forth in order to provide a thorough understanding of the present invention, for example, multiple references are made to specific computer display resolutions and data word bit-widths of communication lines. These specific values are exemplary only. To one skilled in the art, however, it will be appreciated that the present invention may be practiced without such specific details and that a wide range of display resolutions and data-word-bit-width values can be used within the scope of the present invention. In other instances, well-known methods, procedures, control structures and gate level circuits have not been shown in detail in order not to obscure the present invention.

With today's device technology, the development of specialized integrated circuits and programmable logic generally do not require the rendering of fully detailed circuit diagrams. The definition of logic functionality allows computer design techniques to design the desired logic and circuits. Additionally, microcontrollers are known to operate based on a desired flow diagram rendered into software that is compatible with a selected microcontroller. Accordingly, portions of the present invention will be described primarily in terms of functionality to be implemented by a microcontroller and other associated electronic components. This functionality will be described and those of ordinary skill in the art, once given the following descriptions of the various functions to be carried out by the present invention will be able to implement the necessary microcontroller structure and logic for various logic devices or custom designed integrated circuits in suitable technologies without undue experimentation.

Figure 1:
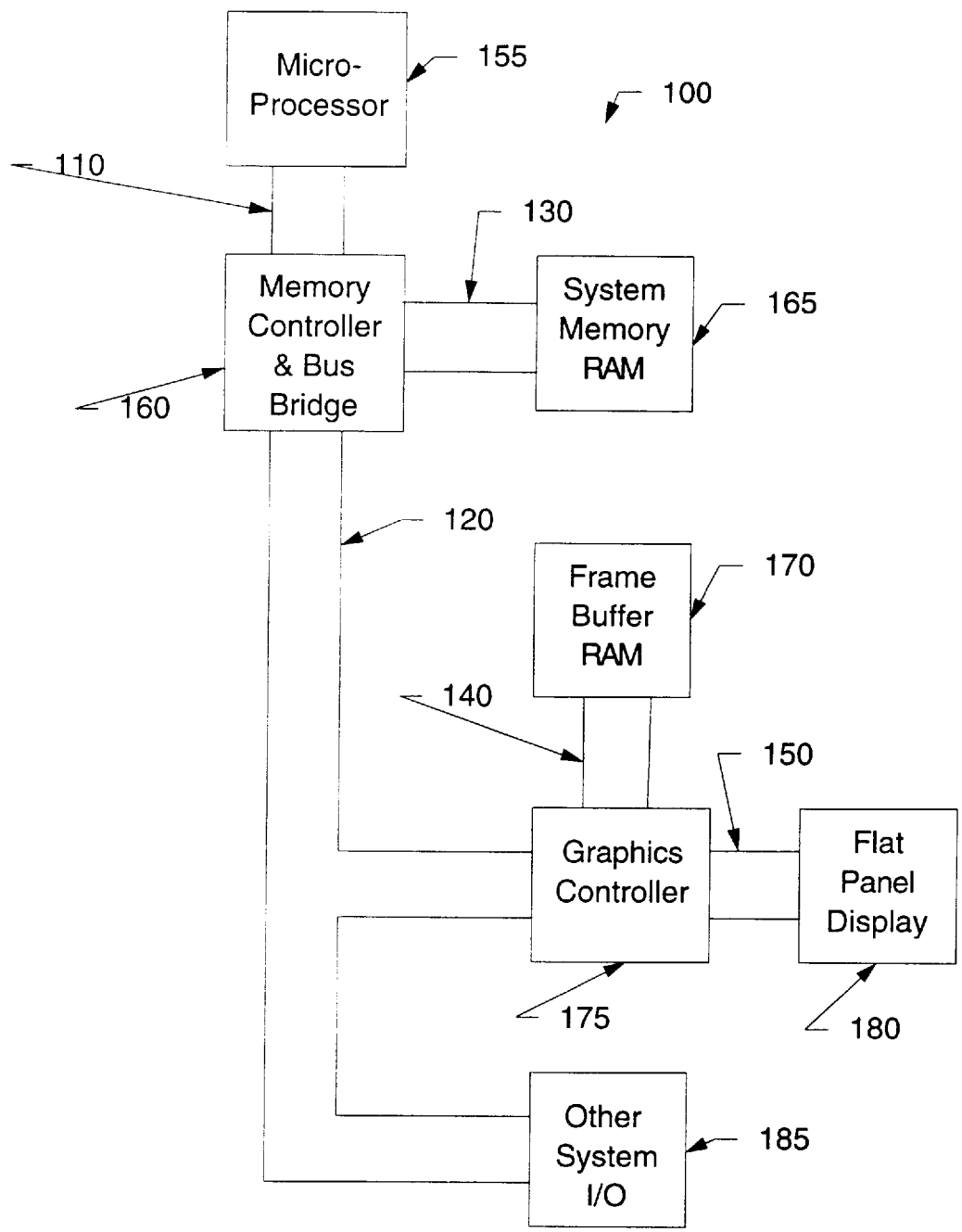
FIG. 1 is a schematic diagram illustrating a partial computer system including a preferred embodiment of the present invention for rotating display images on a display device.

FIG. 1 is a block diagram illustrating a partial computer system 100 in accordance with the present invention. This computer system 100 for transferring information from one subsystem to another comprises a system bus 110, an I/O bus 120, a memory bus 130, a frame buffer bus 140 and a display bus 150. The computer system 100 further includes a microprocessor (CPU) 155 being coupled to the system bus 110 for processing information and instructions, a system memory 165 being coupled to the memory bus 130 for storing information for system use, a memory controller/bridge 160 being coupled to the CPU 155 via the system bus 110 and to the system memory 165 via the memory bus 130, a frame buffer memory 170 being coupled to the frame buffer bus 140, a display device 180 being coupled to the display bus 150 and a graphics video display controller 175 for processing image information and for directing the processed image information to the associated display device 180, the display controller 175 being coupled to the frame buffer memory 170 and the display device 180. The display device 180 may be a flat panel display, a liquid crystal device, even a cathode ray tube device, or other display devices suitable for creating graphics images and alphanumeric characters recognizable to users. In fact, the display device 180 is generic in that it could represent more than one display. Lastly, the computer system 100 includes other system I/O 185 such as hard disk, floppy disk and CD ROM subsystems.

In operation, an image frame buffer (not shown) to be displayed on the display device 180 is stored into the frame buffer memory 170 by the CPU 155. The graphics video display controller 175 may or may not interfere with the CPU 155 addressing of the image frame buffer inside the frame buffer memory 170. Presumably, such CPU addressing is advantageous for its operations. When the image shown on the display device 180 is to be rotated, however, the graphics controller 175, at that time, will interfere and manipulate the CPU 155 addressing of the image frame buffer without requiring the CPU 155 to spend its cycles on address transformation operations. Furthermore, the configuration of the frame buffer memory 170, graphics controller 175, and CPU 155 as shown in FIG. 1 should not be construed as limiting in the sense that other configurations can also be operable and be embodied within the scope of the present invention, for example, a configuration having a two-ported VRAM-like frame buffer memory where one port is coupled to a CPU and the other port is coupled to a graphics controller.

Figure 2:
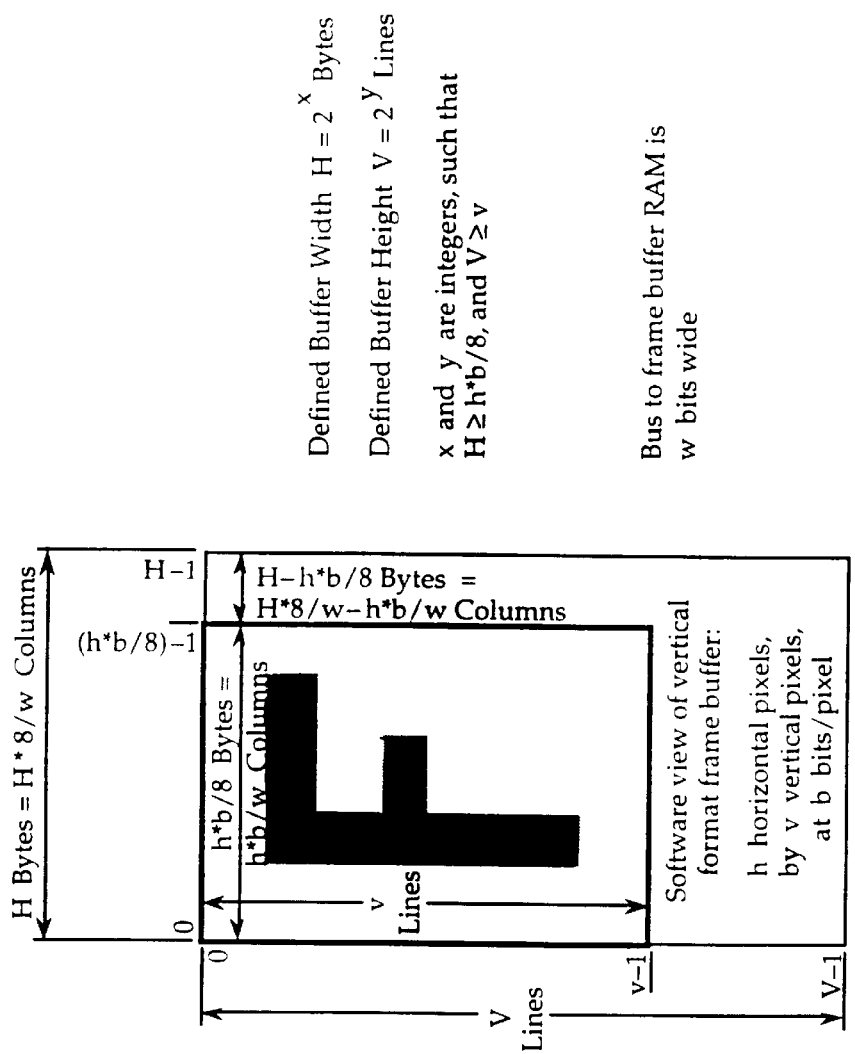
FIG. 2 illustrates how a "defined frame buffer" containing an alphabet "F" in the vertical format is "viewed" or addressable by the CPU.

As discussed earlier in the Summary of the Invention that the concept of a "defined frame buffer" would provide certain efficiency advantages for image rotation, FIG. 2 illustrates how a defined frame buffer containing an alphabet "F" in the vertical format is "viewed" or addressable by the CPU 155. The defined frame buffer parameters H, V, x, and y and other related parameters h, v, and b are briefly defined in FIG. 2. In addition, w is the width of the data bus to the frame buffer memory 170 (i.e., the width of the frame buffer memory bus 140), and not necessarily the width of the I/O bus 120. The horizontal width H of the defined frame buffer (in bytes) is a power of 2 that equals or exceeds the width h*b/8 of the display portion (also in bytes). Similarly, the vertical height V of the defined frame buffer (in lines) is a power of 2 that equals or exceeds the number of vertical pixels v. For example, if a vertical-format buffer is 600 pixels wide by 800 pixels high, at 16 bits/pixel, the smallest value for H would be 2048 (i.e., the smallest power of 2 larger than h*b/8=1200) and the smallest V would be 1024 (i.e., smallest power of 2 larger than v=800). In general, to minimize the amount of frame buffer memory 170 used, the value for H can preferably be changed to a minimum value for each change in the value of b, alternatively, H can be set permanently to a maximum value corresponding to the maximum value of b.

Figure 3A:
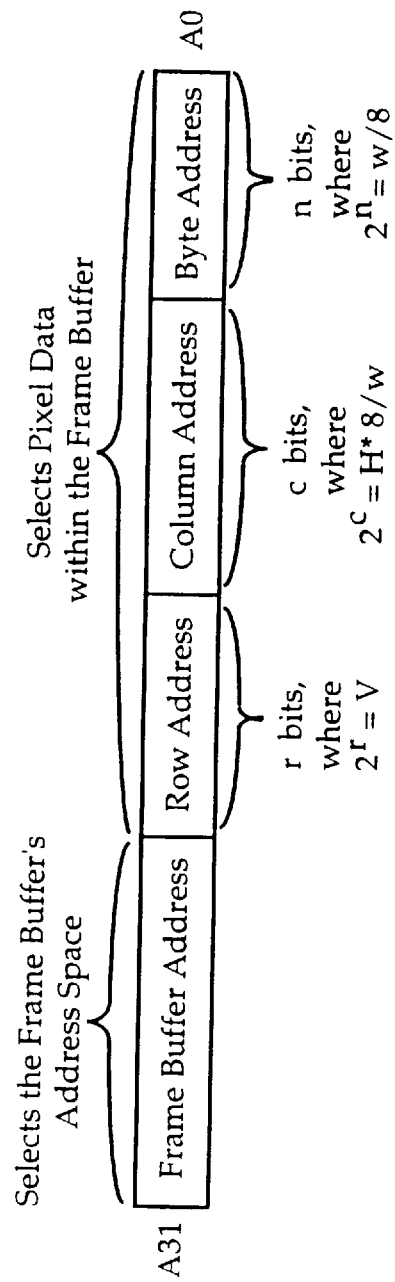
FIG. 3A illustrates an addressing scheme used by the CPU of the partial computer system of FIG. 1 for accessing frame buffer information.

A frame buffer addressing scheme used by the CPU 155 in accordance with the defined frame buffer concept is illustrated in FIG. 3A. The term "CPU address" refers to an address issued by the microprocessor (CPU) 155 or another device when the executing software accesses the frame buffer. The graphics controller 175 accesses the frame buffer for image display and refresh using its own addresses (which may or may not be the same as the CPU addresses). FIG. 3A shows a 32-bit address issued by the CPU 155 having row, column and byte address fields for accessing an image stored in the frame buffer memory 170. For implementation purposes, the various field and defined frame buffer parameters for a number of display resolutions, bits per pixel rates and frame buffer memory bus widths have been provided in FIG. 3B.

Figure 4:
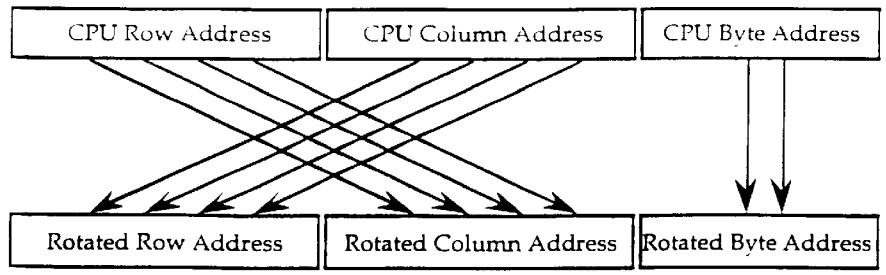
FIG. 4 illustrates an embodiment of the present invention for CPU address transformation either in hardware or in software for providing a rotated image having a different orientation on a display device than that of the original image.
Figure 5:
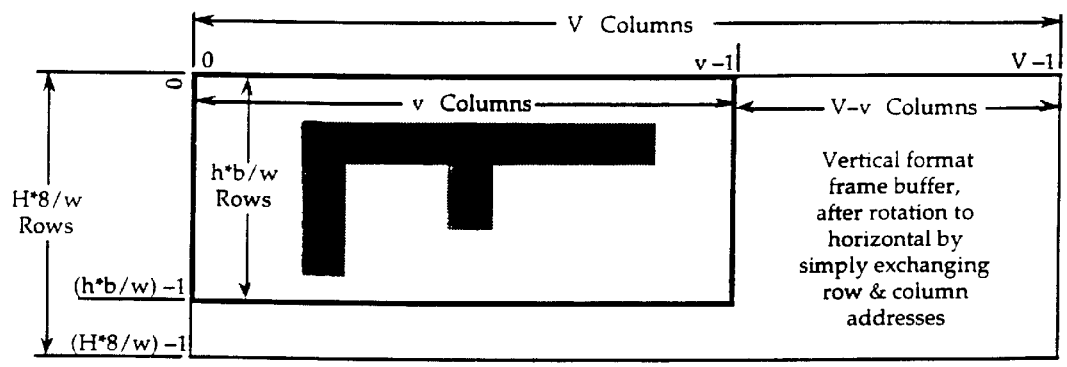
FIG. 5 illustrates a resulting image after the row and column addresses for the image shown in FIG. 2 have been exchanged in accordance with the present invention.

The graphics video display controller 175 can alter any CPU 155 addresses received before actually writing or reading any images physically stored in the frame buffer memory 170. As long as the same alteration is applied to both reading and writing operations, the software will never know that the images are actually physically stored in a different format. In one preferred embodiment for image rotation, the graphics video display controller 175 creates a new, rotated frame buffer memory address by exchanging the CPU Column address bits with the CPU Row address bits as shown in FIG. 4. The CPU Byte address bits retain their original position as the least-significant bits. If this address transformation is used on both reads and writes by the CPU 155, then to the software, it will continue to "see" (address) any re-oriented image frame buffer stored in the frame buffer memory 170 as in its original, and in this case, in its vertical, format. For refreshing the display images, however, the graphics controller 175 can read the image frame buffer as it is actually stored in its rotated format in the frame buffer memory 170. For example, one preferred aspect of the invention physically stores the image frame buffer as shown in FIG. 5 into the frame buffer memory 170. One does need to note that what is actually stored into the frame buffer memory 170 depends on how and how much of the present invention is implemented in hardware.

Applying the above transformation to one embodiment, the defined frame buffer shown in FIG. 2 as addressed by the CPU 155 is actually stored in the frame buffer memory 170 as shown in FIG. 5. The CPU address transformation as illustrated in FIG. 4 is summarized in the following:

Rotated Row address bits=CPU Column address bits
Rotated Column address bits=CPU Row address bits
Rotated Byte address bits=CPU Byte address bits This basic transformation has rotated software's vertical format to a horizontal format, by simply exchanging the CPU columns for the CPU rows (lines). A closer look at the rotation reveals that it has been rotated 90° counter-clockwise, but it is reversed vertically; in other words, it looks like a mirror image of the original vertical frame buffer, and rotated counter-clockwise. It does not provide the corresponding 90° image rotation desired when a display device or a hand-held computer is physically rotated either clockwise or counter-clockwise. Nevertheless, such desired rotated images could still be obtained in a number of ways.

Figure 6:
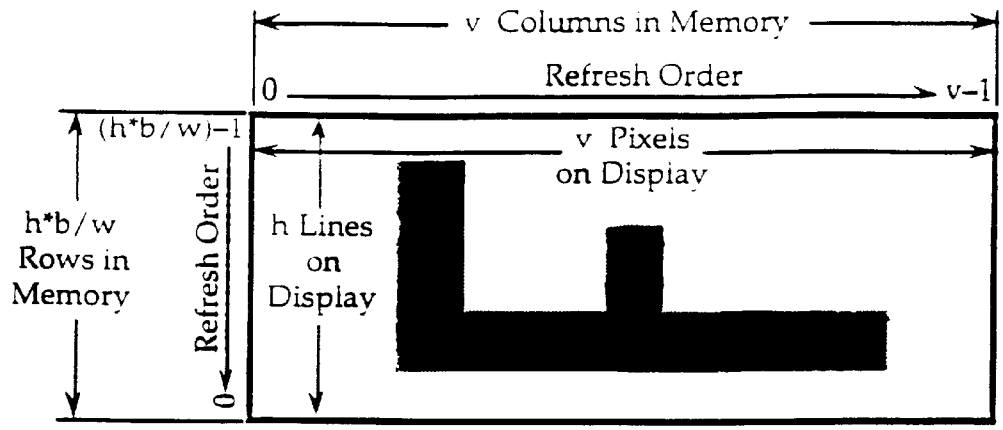
FIG. 6 illustrates a counter-clockwise 90° rotation of the image as shown in FIG. 2 implemented by an embodiment of the present invention.

In another preferred embodiment, a correct, counter-clockwise 90° image rotation for the image as shown in FIG. 2 can be derived from the image as shown in FIG. 5 if the graphics controller 175 merely accesses the rotated rows in the frame buffer memory 170 in reverse or decremental order when retrieving data for refresh, starting with the maximum rotated row (h*b/w)-1 and ending with row 0. The resulting rotated image as displayed on the display device 180 is shown in FIG. 6.

Figure 7:
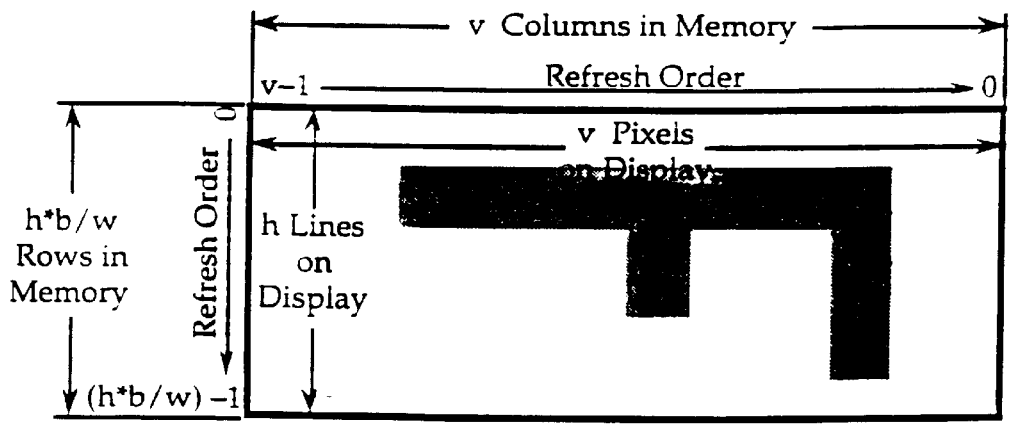
FIG. 7 illustrates a clockwise 90° rotation of the image as shown in FIG. 2 implemented by an embodiment of the present invention.

Similarly, a clockwise 90° image rotation is obtained if the graphics controller 175 accesses the "rotated" columns in the frame buffer memory 170 as shown in FIGS. 4 & 5 in the reverse or decremental order when refreshing the display, starting with the maximum rotated column v-1 and ending with column 0. And the resulting image as displayed on the display device 180 for a clockwise rotation is shown in FIG. 7.

Figure 8A:
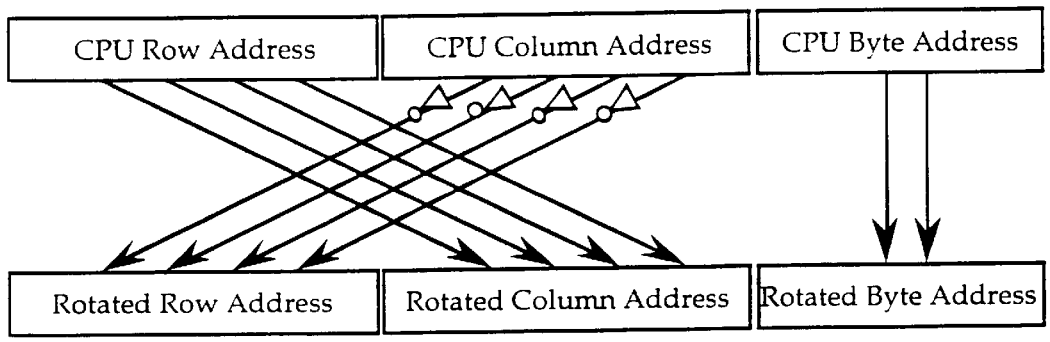
FIG. 8A illustrates a CPU address transformation embodiment either in hardware or in software for providing a 90° counter-clockwise image rotation for images on a display device.
Figure 8B:
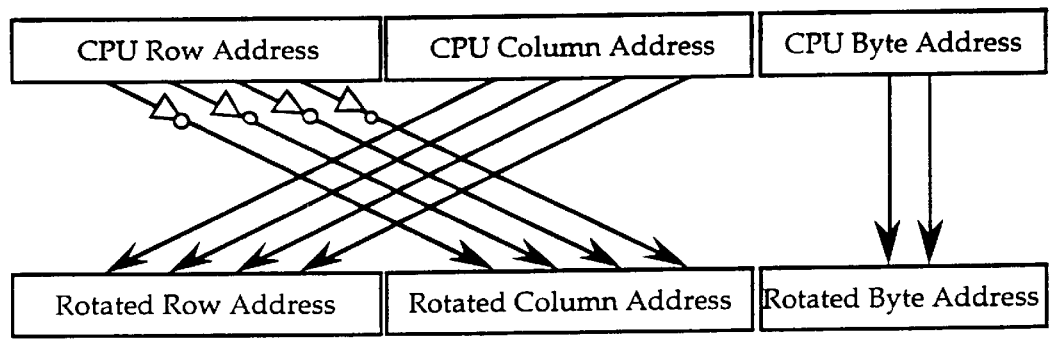
FIG. 8B illustrates a CPU address transformation embodiment either in hardware or in software for providing a 90° clockwise image rotation for images on a display device.
Figure 9A:
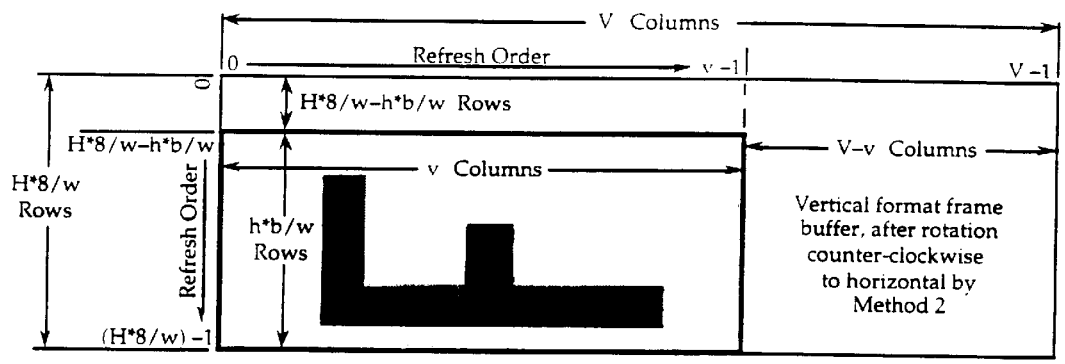
FIG. 9A illustrates a rotated image as stored in the frame buffer memory in the embodiment illustrated in FIG. 8A.
Figure 9B:
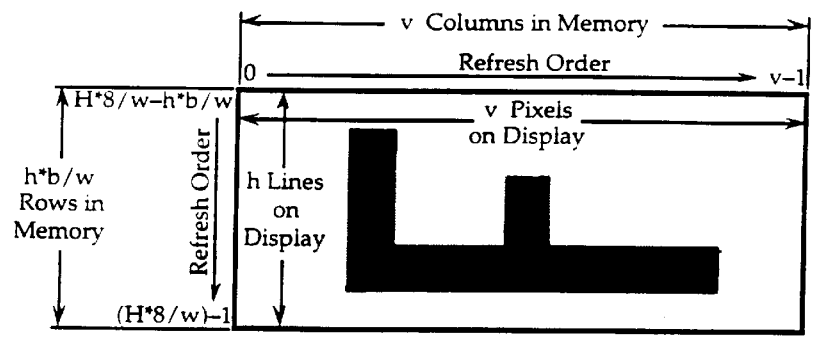
FIG. 9B illustrates an image appearance on the display device after a counter-clockwise image rotation operation for the embodiment illustrated in FIG. 8A.
Figure 10A:
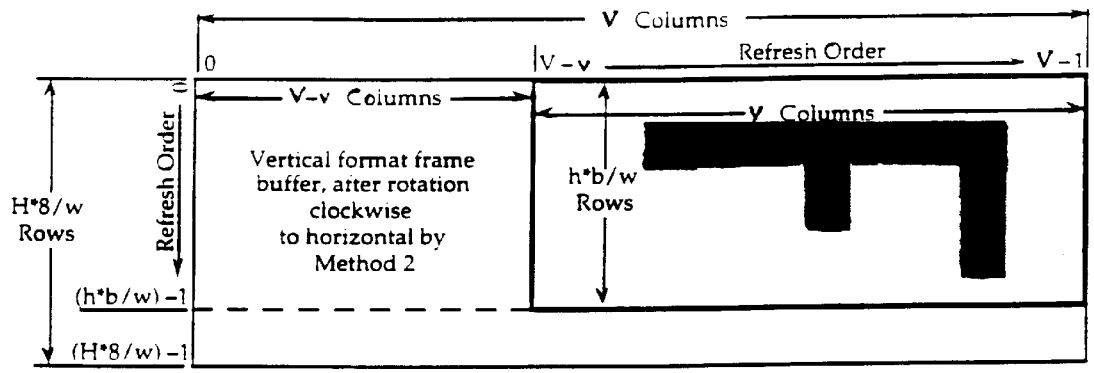
FIG. 10A illustrates a rotated image as stored in the frame buffer memory in the embodiment illustrated in FIG. 8B.
Figure 10B:
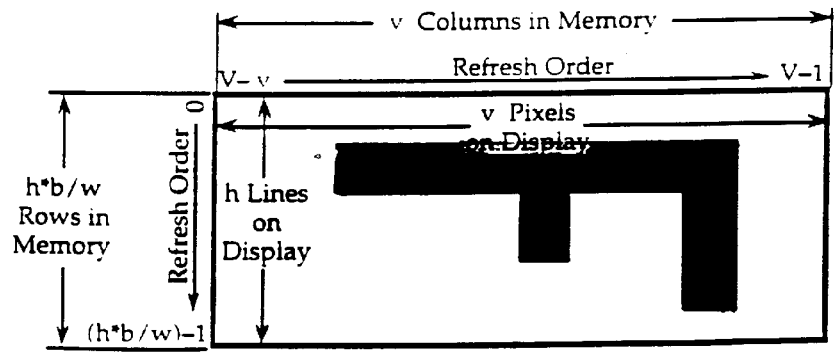
FIG. 10B illustrates an image appearance on the display device after a clockwise rotation image operation for the embodiment illustrated in FIG. 8B.

It is not always convenient or possible to sequentially access the rows or columns of a frame buffer in reverse order. For example, the graphics controller's DMA engine may be designed only for incremental display refresh operations. In response to this limitation, an implementation for a 90° counter-clockwise rotation requires subtracting each rotated row address from the maximum rotated row address (H*8/w)-1 in the defined frame buffer as shown in FIG. 5. This subtraction operation is simply accomplished by merely inverting each bit of the rotated row address. The entire sequence of operations for this 90° counter-clockwise image rotation, i.e., an exchange of CPU row and column addresses, and followed by a bitwise inversion of the exchanged row addresses, can be summarized as an exchange of CPU row and bitwise-inverted column addresses. Therefore, in this preferred embodiment, the CPU address transformation implementation is illustrated in FIG. 8A and the transformed image and stored in the frame buffer memory 170 is shown in FIG. 9A. FIG. 9B illustrates the image appearance on the display device 180 after a counter-clockwise rotation has been achieved by refreshing rotated rows H*8/w-h*b/w to (H*8/w)-1 in an incremental order. Correspondingly, FIG. 8B illustrates a CPU address transformation implementation for a 90° clockwise image rotation; briefly, it is an exchange of CPU column and bitwise-inverted row addresses. The transformed image stored in the frame buffer memory 170 for this implementation is shown in 10A. And FIG. 10B illustrates the image appearance on the display device 180 after a clockwise rotation has been achieved by refreshing rotated columns V-v to V-1 in an incremental order.

In either implementation, appropriate rotated images will be displayed when the graphics controller 175 retrieves data from the frame buffer memory 170 and refreshes the displayed images in a normal or incremental manner.

A variation to the above embodiment in which each row or column address is subtracted from the maximum rotated row or column address in the display portion of the defined frame buffer can be described as follows:

For 90° Counter-clockwise Image Rotation:
Rotated Row Address=Highest Display Column Address-CPU Column Address
(note: Highest Display Column Address=[h*b/w]-1)
Rotated Column Address=CPU Row Address Rotated Byte Address=CPU Byte Address For 90° Clockwise Image Rotation:

Rotated Row Address=CPU Column Address

Rotated Column Address=Highest Display Row Address-CPU Row Address (note: Highest Display Row Address=v-1)

Rotated Byte=CPU Byte

This implementation is computationally more intensive than earlier embodiments; but it is perhaps conceptually more straightforward than the earlier embodiments. And it does allow the rotated rows be sequentially accessed from the frame buffer memory 170 in the same order (starting with rotated row and column address 0) for both clockwise and counter-clockwise rotation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A computer system including a processor and a display system, the display system having a memory, said display system comprising:

a display means for displaying image information to be arranged in a plurality of horizontal lines of pixel data;

a frame buffer containing the image information, the frame buffer being stored in the memory in a manner that data of each of the plurality of horizontal lines including pixel data for the display means being stored in the memory resulting in the frame buffer occupying a contiguous block in the memory and the frame buffer further being accessible by the processor using a processor address set of row and column addresses;

controller means for establishing new row addresses of a controller address set as the column addresses of the processor address set, and establishing new column addresses of the controller address set as the row addresses of the processor address set;

the controller means being coupled to the display means for transferring the pixel data of the frame buffer to the display means using the new controller address set, the controller means setting each of the new row addresses of the controller address set as the difference between its current value and a maximum value of the new row addresses of the controller address set and providing the pixel data of the frame buffer to the display means while referencing both the new row addresses and the new column addresses of the controller address set in an ascending order.

2. The computer system of claim 1 wherein the maximum value of the new row addresses of the controller address set refers to the maximum row address where the pixel data displayable on the display means are stored in the memory.

3. The computer system of claim 1 wherein the controller means sets each of the new column addresses of the controller address set as the difference between its current value and a maximum value of the new column addresses of the controller address set and provides the pixel data of the frame buffer to the display means while referencing both the new row addresses and the new column addresses of the controller address set in an ascending order.

4. The computer system of claim 3 wherein the maximum value of the new column addresses of the controller address set refers to the maximum column address where the pixel data displayable on the display means are stored in the memory.

5. A method for rotating images for a computer system, the computer system including a processor and a display system, the display system having a memory, said method comprising the steps of:

displaying image information on display means arranged in a plurality of horizontal lines of pixel data;

storing a frame buffer in the memory, the frame buffer containing the image information, the frame buffer being stored in the memory in a manner such that data of each of the plurality of horizontal lines including pixel data for the display means are stored in the memory resulting in the frame buffer occupying a contiguous block in the memory and the frame buffer further being accessible by the processor using a processor address set of row and column addresses;

establishing new row addresses of a controller address set as the column addresses of the processor address set, and establishing new column addresses of the controller address set as the row addresses of the processor address set;

transferring the pixel data of the frame buffer to the display means using the new controller address set, the transferring step setting each of the new row addresses of the controller address set as the difference between its current value and a maximum value of the new row addresses of the controller address set and providing the pixel data of the frame buffer to the display means while referencing both the subtracted-from-maximum new row addresses and the new column addresses of the controller address set in an ascending order.

6. The method of claim 5 wherein the maximum value of the new row addresses of the controller address set refers to the maximum row address where the pixel data displayable on the display means are stored in the memory.

7. The method of claim 5 wherein the transferring step further includes setting each of the new column addresses of the controller address set as the difference between its current value and a maximum value of the new column addresses of the controller address set and providing the pixel data of the frame buffer to the display means while referencing both the new row addresses and the subtracted-from-maximum new column addresses of the controller address set in an ascending order.

8. The method of claim 7 wherein the maximum value of the new column addresses of the controller address set refers to the maximum column address where the pixel data displayable on the display means are stored in the memory.

* * * * *